United States Patent
Chang

(10) Patent No.: US 12,017,563 B2
(45) Date of Patent: Jun. 25, 2024

(54) SEAT RECLINER FOR VEHICLES

(71) Applicant: HYUNDAI TRANSYS INCORPORATED, Seosan-si (KR)

(72) Inventor: Seung Hun Chang, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 0 days.

(21) Appl. No.: 17/874,921

(22) Filed: Jul. 27, 2022

(65) Prior Publication Data

US 2023/0051535 A1 Feb. 16, 2023

(30) Foreign Application Priority Data

Aug. 10, 2021 (KR) .................. 10-2021-0105419

(51) Int. Cl.
- *B60N 2/20* (2006.01)
- *B60N 2/225* (2006.01)
- *B60N 2/235* (2006.01)
- *B60N 2/68* (2006.01)

(52) U.S. Cl.
CPC .............. *B60N 2/20* (2013.01); *B60N 2/2252* (2013.01); *B60N 2/235* (2013.01); *B60N 2/2352* (2013.01); *B60N 2/682* (2013.01)

(58) Field of Classification Search
CPC .. B60N 2/2352; B60N 2/2356; B60N 2/2252; B60N 2/235; B60N 2/20; B60N 2/682
See application file for complete search history.

(56) References Cited

U.S. PATENT DOCUMENTS

| | | | |
|---|---|---|---|
| 7,390,061 B2 * | 6/2008 | Lange | B60N 2/2252 297/463.1 |
| 8,152,241 B2 * | 4/2012 | Krueger | B60N 2/2252 297/367 R |
| 9,102,248 B2 * | 8/2015 | Matt | B60N 2/2356 |
| 9,527,410 B2 * | 12/2016 | Leconte | B60N 2/2252 |
| 9,663,003 B2 * | 5/2017 | Siller | B60N 2/2252 |
| 9,669,743 B2 * | 6/2017 | Radler | B60N 2/682 |
| 11,034,265 B2 * | 6/2021 | Leportier | B60N 2/2252 |
| 2021/0309130 A1 * | 10/2021 | Üstünberk | B60N 2/2254 |

(Continued)

FOREIGN PATENT DOCUMENTS

| DE | 102004062049 A1 | 7/2006 |
|---|---|---|
| KR | 101003718 B1 | 12/2010 |
| KR | 1020110087067 A | 8/2011 |

(Continued)

*Primary Examiner* — Syed A Islam
(74) *Attorney, Agent, or Firm* — Bridgeway IP Law Group, PLLC; Jihun Kim

(57) ABSTRACT

A seat recliner for vehicles includes a mobile flange provided such that an upper part thereof is open and configured to define a seating space through a bottom surface and a side surface and to have an internal gear formed along an inner side of the side surface, and a support groove formed between upper ends of the internal gear and the side surface, a gear plate inserted into the seating space of the mobile flange, and configured to have an external gear formed along an outer side of a side surface of the gear plate, and a support configured to extend outwards from an upper end of the external gear and located in the support groove, and a retainer configured to cover both upper parts of the mobile flange and the gear plate, and fixed to an upper end of the mobile flange.

9 Claims, 6 Drawing Sheets

(56) References Cited

U.S. PATENT DOCUMENTS

2022/0219577 A1\* 7/2022 Scholz ................ B60N 2/2252

FOREIGN PATENT DOCUMENTS

| KR | 1020130101765 A | 9/2013 |
| KR | 101382118 B1 | 4/2014 |
| KR | 1020140068662 A | 6/2014 |
| KR | 101711826 B1 | 3/2017 |
| KR | 102070023 B1 | 1/2020 |
| KR | 10-2223025 B1 | 3/2021 |
| WO | 2004089684 A1 | 10/2004 |

\* cited by examiner

SEAT RECLINER FOR VEHICLES

CROSS-REFERENCE TO RELATED APPLICATION

This application claims priority from Korean Patent Application No. 10-2021-0105419, filed Aug. 10, 2021, in the Korean Intellectual Property Office, the disclosure of which is incorporated herein by reference in its entirety.

BACKGROUND OF THE INVENTION

1. Field of the Invention

The present invention relates to a seat recliner for vehicles which may secure a sufficient support area between a retainer and the upper end of a gear plate, even though the radius of a base of the gear plate is increased in order to secure coupling strength of the gear plate, and may thus secure sufficient coupling strength and component supporting strength without increasing the overall size of the seat recliner.

2. Description of the Related Art

A seat recliner for vehicles includes a mobile flange having an internal gear, a gear plate eccentrically provided in the mobile flange and engaged therewith through an external gear, and an eccentric cam configured to cause eccentricity of the gear plate.

The seat recliner essentially requires resistance strength to the load of a passenger or load applied in the event of a vehicle crash and, for this purpose, it is necessary to secure coupling strength through stable engagement between the internal gear and the external gear and securement of support force between elements.

In the case of a conventional seat recliner shown in FIG. 1, a mobile flange 10 may be coupled to a seat back, a gear plate 30 may be coupled to a seat cushion, the outer diameter B of the gear plate 30 coupled to the seat cushion may be less than the outer diameter A of the mobile flange 10 coupled to the seat back, and thereby, the coupling length between the gear plate 30 and the seat cushion may be short and a corresponding point may be a weak spot. Therefore, the corresponding point requires increase in the strength thereof, and, when the outer diameter B of the gear plate 30 coupled to the seat cushion is increased by increasing the thickness of a base 32 of the gear plate 30 in the direction of an arrow C shown in this figure in order to increase the strength of the seat recliner, the welding length of the gear plate 30 to the seat cushion is increased, and thus, coupling strength therebetween may be increased.

However, in this case, the inner diameter of the retainer 50 is increased in the direction of an arrow D shown in this figure while the outer diameter of the retainer 50 is maintained, and thus, the area of the retainer 50 supporting the gear plate 50 is reduced, and the supporting strength of the retainer 50 is reduced.

In order to solve such a problem, it is necessary to increase the overall size of the seat recliner, but the increase in the overall size of the seat recliner also increases the weight of the seat recliner and manufacturing costs of the seat recliner.

Therefore, technology that may improve both coupling strength and supporting strength of a seat recliner without increasing the overall size of the seat recliner is required.

The above information disclosed in the Background section is only for enhancement of understanding of the background of the invention and should not be interpreted as conventional technology that is already known to those skilled in the art.

SUMMARY OF THE INVENTION

Therefore, the present invention has been made in view of the above problems, and it is an object of the present invention to provide a seat recliner for vehicles which may secure a sufficient support area between a retainer and the upper end of a gear plate, even though the radius of a base of the gear plate is increased in order to secure coupling strength of the gear plate, and may thus secure sufficient coupling strength and component supporting strength without increasing the overall size of the seat recliner.

In accordance with the present invention, the above and other objects can be accomplished by the provision of a seat recliner for vehicles including a mobile flange provided such that an upper part thereof is open, and configured to define a seating space through a bottom surface and a side surface and to have an internal gear formed along an inner side of the side surface, and a support groove formed between an upper end of the internal gear and an upper end of the side surface to be located above the internal gear, a gear plate inserted into the seating space of the mobile flange, and configured to have an external gear formed along an outer side of a side surface of the gear plate so that the external gear is engaged with the internal gear in a state in which the gear plate is eccentric from the mobile flange, and a support configured to extend outwards from an upper end of the external gear so as to be located in the support groove, and a retainer configured to cover both upper parts of the mobile flange and the gear plate, and fixed to an upper end of the mobile flange.

A central part may protrude from a center of the bottom surface of the mobile flange, an eccentric cam may be provided between the central part and the gear plate, and the external gear and the internal gear may be engaged with each other in a state in which the gear plate is eccentric from the mobile flange through pressing by the eccentric cam.

The support groove and the support may be formed in a ring shape, and the mobile flange and the gear plate may be rotated relative to each other in a state in which the support is placed in the support groove during reclining of a seat.

The internal gear may be formed on the inner side of the side surface of the mobile flange up to a designated height, and the support groove may be formed in a remaining part of the inner side of the side surface above the internal gear.

The support of the gear plate may be located in the support groove in a spot where the external gear and the internal gear are engaged with each other.

The support of the gear plate may be formed to have a shape integrally connected to the external gear using one material.

The support may protrude such that an outermost point thereof is located farther outwards than an outermost point of the external gear.

The retainer may be a ring-shaped plate having an external border and an internal border, the external border may be welded to the upper end of the mobile flange, the internal border may face the upper end of the external gear, and a central portion of the retainer between the external border and the internal border may face the support so as to cover the support.

The gear plate may have a base provided in a form of a vertical cylinder having a hollow formed in a center thereof, the external gear may protrude outwards from a side surface of the base, and the support may extend outwards from the upper end of the external gear.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to exemplary embodiments of the present invention, examples of which are illustrated in the accompanying drawings. Wherever possible, the same reference numbers will be used throughout the drawings to refer to the same or like parts.

Figure 1:
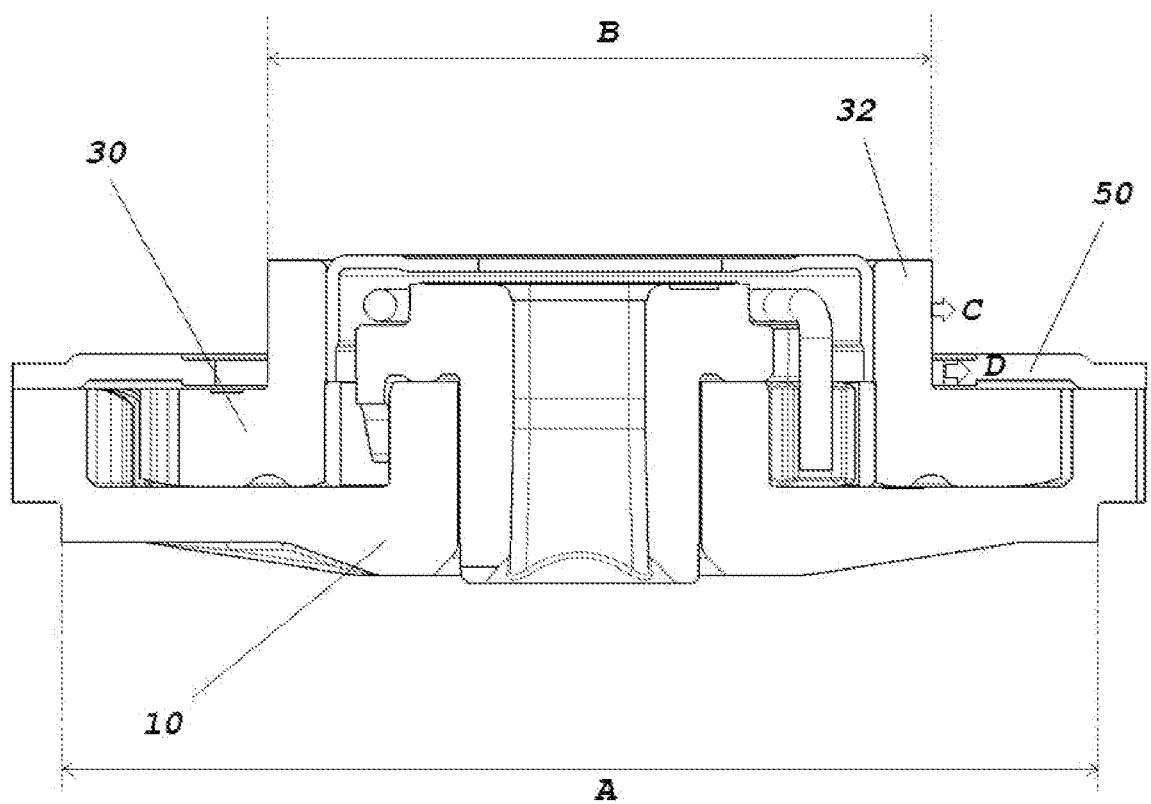
FIG. 1 is a cross-sectional view of a conventional seat recliner for vehicles.
Figure 2:
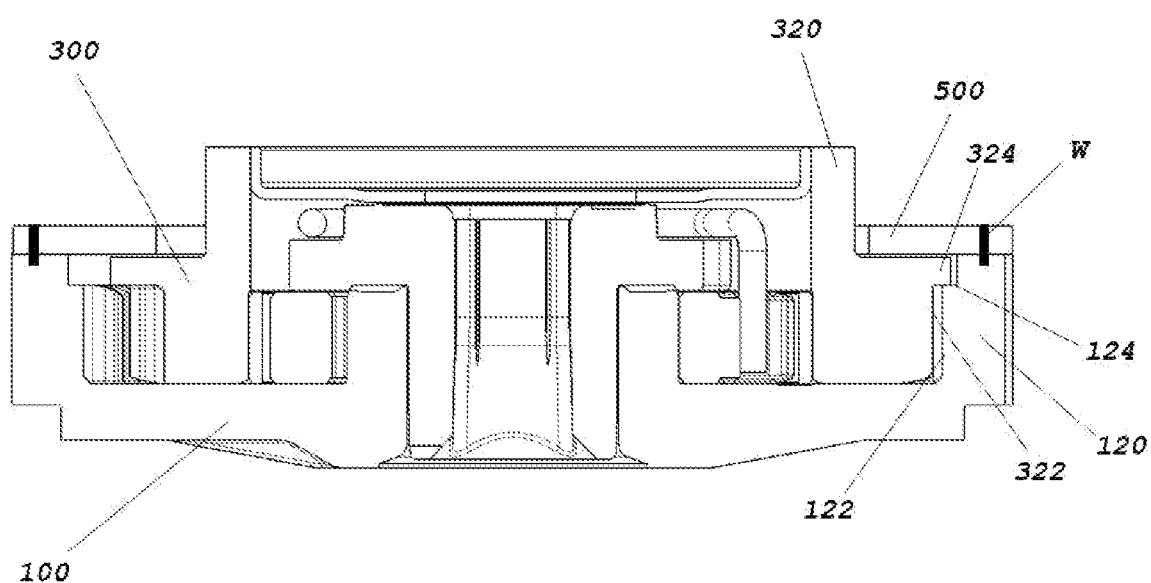
FIG. 2 is a cross-sectional view of a seat recliner for vehicles according to one embodiment of the present invention.
Figure 3:
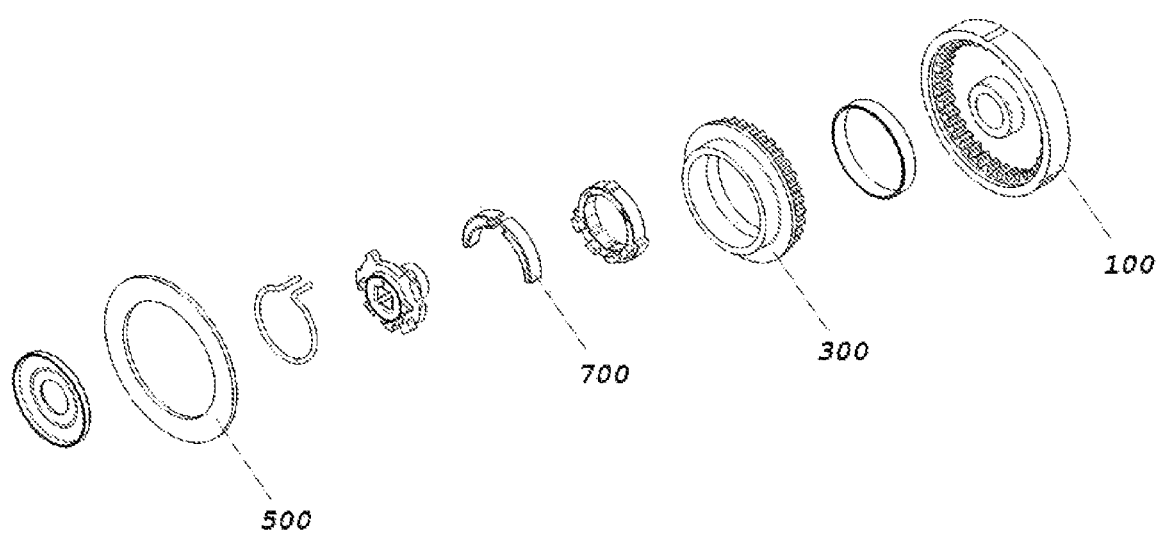
FIG. 3 is an exploded perspective view of the seat recliner for vehicles according to one embodiment of the present invention.
Figure 4:
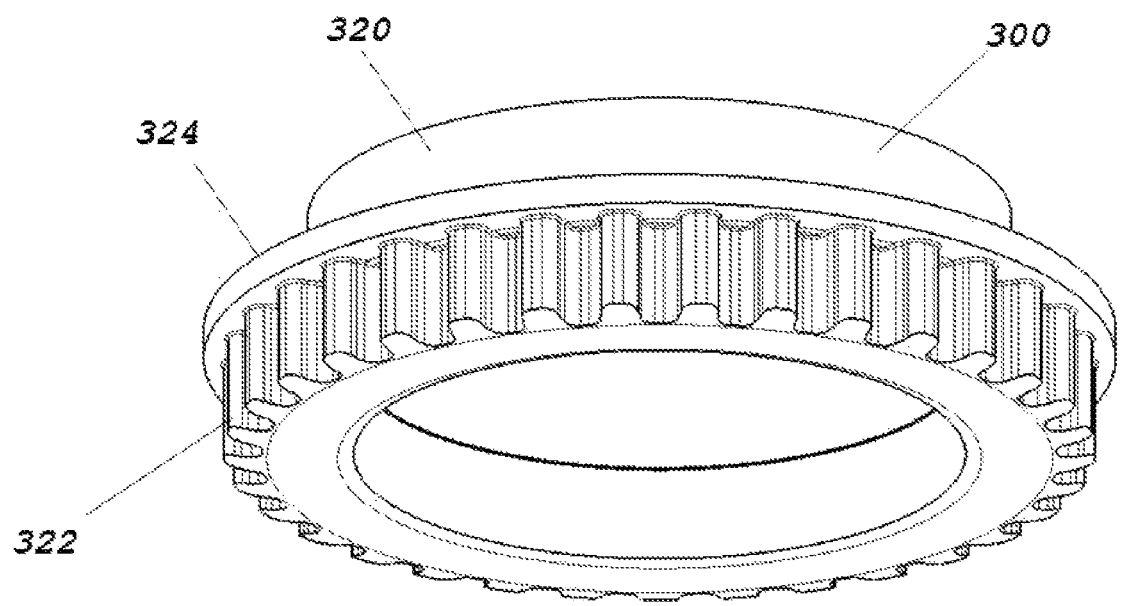
FIG. 4 is a perspective view of a gear plate of the seat recliner for vehicles according to one embodiment of the present invention.
Figure 5:
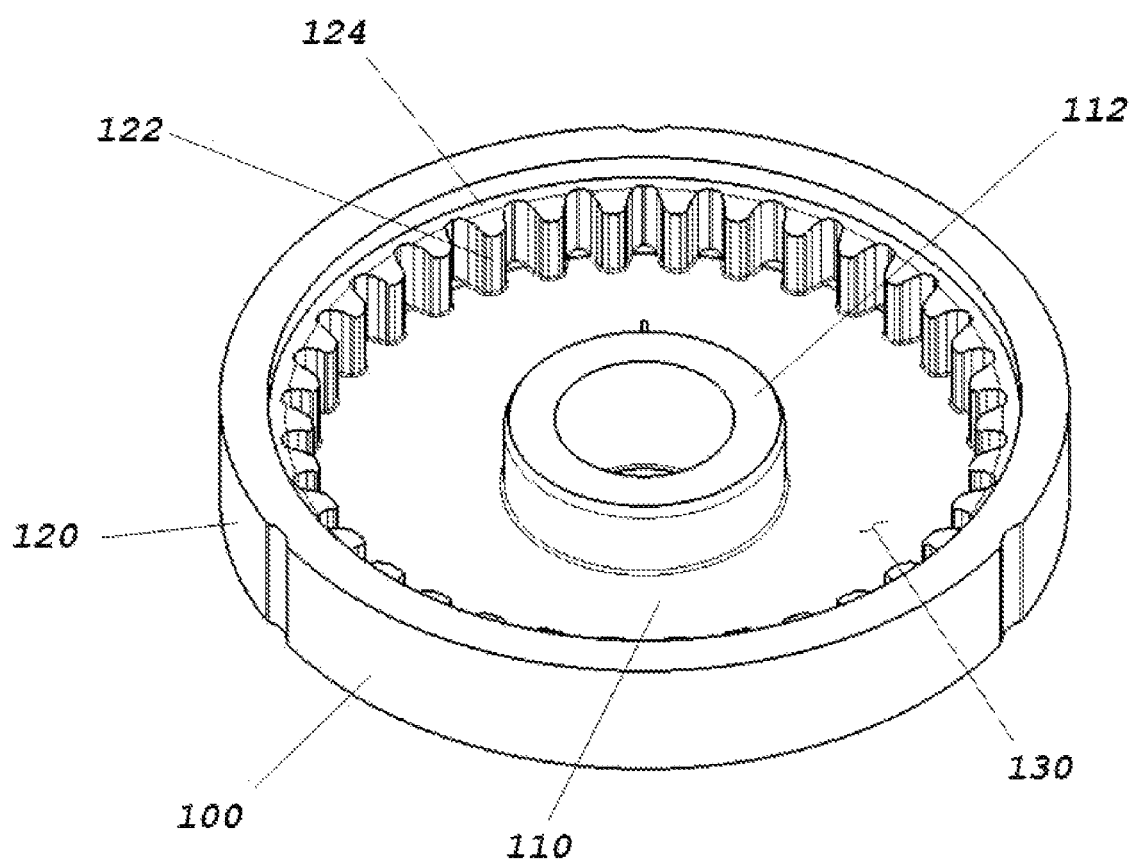
FIG. 5 is a perspective view of a mobile flange of the seat recliner for vehicles according to one embodiment of the present invention.
Figure 6:
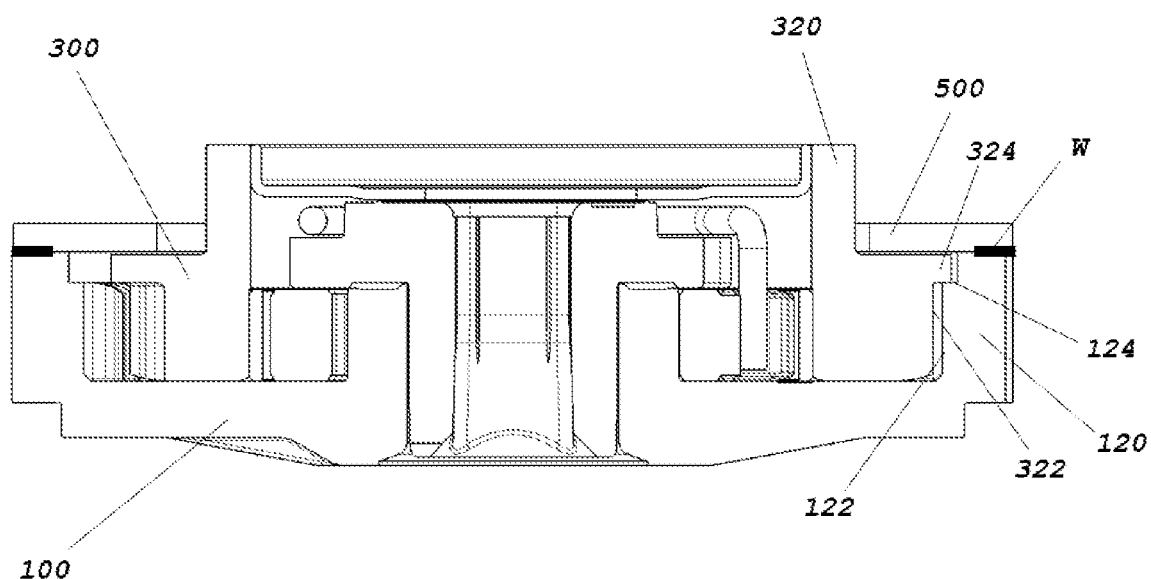
FIG. 6 is a cross-sectional view of a seat recliner for vehicles according to another embodiment of the present invention.

FIG. 2 is a cross-sectional view of a seat recliner for vehicles according to one embodiment of the present invention, FIG. 3 is an exploded perspective view of the seat recliner for vehicles according to one embodiment of the present invention, FIG. 4 is a perspective view of a gear plate of the seat recliner for vehicles according to one embodiment of the present invention, FIG. 5 is a perspective view of a mobile flange of the seat recliner for vehicles according to one embodiment of the present invention, and FIG. 6 is a cross-sectional view of a seat recliner for vehicles according to another embodiment of the present invention.

A seat recliner for vehicles according to the present invention includes a mobile flange 100 provided such that the upper part thereof is open, and configured to define a seating space 130 through a bottom surface 110 and a side surface 120 and to have an internal gear 122 formed along the inner side of the side surface 120 and a support groove 124 formed between the upper end of the internal gear 122 and the upper end of the side surface 120 to be located above the internal gear 122, a gear plate 300 inserted into the seating space 130 of the mobile flange 100, and configured to have an external gear 322 formed along the outer side of the side surface of the gear plate 300 so that the external gear 322 is engaged with the internal gear 122 in the state in which the gear plate 300 is eccentric from the mobile flange 100, and a support 324 configured to extend outwards from the upper end of the external gear 322 so as to be located in the support groove 124, and a retainer 500 configured to cover both the upper parts of the mobile flange 100 and the gear plate 300 and fixed to the upper end of the mobile flange 100.

Further, the gear plate 300 may have a base 320 provided in the form of a vertical cylinder having a hollow formed in the center thereof, the external gear 320 may protrude outwards from the side surface of the base 320, and the support 324 may extend outwards from the upper end of the external gear 322.

The seat recliner according to the present invention basically includes the mobile flange 100 coupled to a seat back, the gear plate 300 inserted into and engaged with the mobile flange 100, rotated relative to the mobile flange 100 and coupled to a seat cushion, an eccentric cam 700 configured to press the gear plate 300 to one side so that the gear plate 300 and the mobile flange 100 are eccentrically coupled to each other, and the retainer 500 configured to cover both the upper parts of the mobile flange 100 and the gear plate 300 so as to prevent inner components from being separated from the seat recliner.

Such a seat recliner needs to prioritize securement of coupling strength to the seat back and the seat cushion and assembly strength between the retainer 500 and the inner components, and simultaneously requires technology that may reduce the weight of the seat recliner through a compact size of the seat recliner.

As shown in FIG. 2, the mobile flange 100, which surrounds the components at the outside and has the internal gear 122 formed on the inner surface thereof, has a large outer diameter, and thus comparatively easily secures a coupling length to the seat back.

However, the gear plate 300, which is inserted into the mobile flange 100 and has the external gear 322 formed on the outer surface, has a relatively small outer diameter, and thus has difficulty in securing a coupling length to the seat cushion, and particularly, all the more so in the case in which the overall size of the seat recliner is reduced. Therefore, in order to secure the coupling length between the gear plate 300 and the seat cushion, there is no choice but to increase the thickness of the base 320 of the gear plate 300 while maintaining the overall size of the seat recliner.

However, in this case, the inner diameter of the retainer 500 is increased as much as the increase in the thickness of the base 320, and thereby, the area of the retainer 500 which covers the upper part of the gear plate 300 is reduced, and thus, assembly strength is also reduced.

In view of the above problem, the present invention proposes new coupling relationships which may maintain a sufficient support area between the retainer 50 and the gear plate 300 as in the conventional seat recliner for vehicles while increasing the thickness of the base 320 of the gear plate 300.

Concretely, the mobile flange 100, as shown in FIG. 5, is provided such that the upper part thereof is open, and the seating space 130 is defined through the bottom surface 110 and the side surface 120 of of the mobile flange 100. Various components including the gear plate 300 and the eccentric cam 700 may be located in the seating space 130. Further, the internal gear 122 is formed along the inner side of the side surface 120, i.e., the inner surface, of the mobile flange 100.

Particularly, the support groove 124 is formed in an inwardly indented shape between the upper end of the internal gear 122 and the upper end of the side surface 120 of the mobile flange 100, and is thus located above the internal gear 122.

Further, as shown in FIG. 4, the gear plate 300 is inserted into the seating space 130 of the mobile flange 100, the external gear 322 is formed along the outer side of the side surface, i.e., the outer surface, of the gear plate 300, and the external gear 322 is engaged with the internal gear 122 in the state in which the gear plate 300 is eccentric from the mobile flange 100. Eccentric engagement between the internal gear 122 and the external gear 322 causes the effect of deceleration when the mobile flange 100 and the gear plate 300 are rotated relative to each other.

Further, the support 324, which extends outwards from the upper end of the external gear 322 so as to be located in the support groove 124, is formed on the gear plate 300. That is, the support 324 has the form of a flange extending outwards from the gear plate 300, and the support 324 is placed in the support groove 124 of the mobile flange 100, thereby increasing an area in which the gear plate 300 and the retainer 500 face each other and are supported by each other.

Accordingly, the retainer 500 covers both the upper parts of the mobile flange 100 and the gear plate 300, and is fixed to the upper end of the mobile flange 100 by welding W, and thereby, the upper end of the gear plate 300 extends through the support 324 even though the thickness of the base 320 of the gear plate 300 is increased, the contact area between the gear plate 300 and the retainer 500 remains unchanged or is rather increased, and thus, assembly strength is improved. Here, one ring flange-shaped support 324 may be provided, or a plurality of flange-shaped supports 324 may be provided.

In the case in which the support 324 is omitted, the width of the retainer 500 is decreased, i.e., the inner diameter of the retainer 500 is increased, by the increased thickness of the base 320, and accordingly, an area or a width of a region in which the retainer 500 and the gear plate 300 are supported by each other is reduced, and the assembly strength of the retainer 50 is reduced. However, according to the present invention, the support area of the retainer 500 may remain unchanged, thereby being capable of solving this problem.

More concretely, a central part 112 may protrude from the center of the bottom surface 110 of the mobile flange 100, the eccentric cam 700 may be provided between the central part 112 and the gear plate 300, and the external gear 322 and the internal gear 122 may be engaged with each other in the state in which the gear plate 300 is eccentric from the mobile flange 100 through pressing by the eccentric cam 700. The support groove 124 and the support 324 may be formed in a ring shape so as to correspond to each other, and thus, the mobile flange 100 and the gear plate 300 may be rotated relative to each other in the state in which the support 324 is placed in the support groove 124 during reclining of a seat. Therefore, tilting of or engagement between the mobile flange 100 and the gear plate 300 may be more stably achieved.

Further, the internal gear 122 may be formed on the inner side of the side surface 120 of the mobile flange 100 up to a designated height, and the support groove 124 may be formed in the remaining part of the inner side of the side surface 120 above the internal gear 122. Therefore, a sufficient height of the internal gear 122 may be secured, and thus, sufficient engagement strength and stability between the gear plate 300 and the mobile flange 100 may be secured.

Further, the support 324 of the gear plate 300 may be located in the support groove 124 in a spot where the external gear 322 and the internal gear 122 are engaged with each other. Thereby, the support 324 serves to support the gear plate 300 and the mobile flange 100 to maintain level between the gear plate 300 and the mobile flange 100 in the engagement spot, i.e., a spot where the gear plate 300 eccentrically come into contact with and the mobile flange 100, so as to stably achieve engagement between the internal gear 122 and the external gear 322 without tilting as well as to improve assembly strength with the retainer 500.

The support 324 of the gear plate 300 may be formed to have a shape integrally connected to the external gear 322 using one material. That, the gear plate 300 may be integrally manufactured by press working or forging using one material. In this case, the manufacturing process of the gear plate 300 may be simplified, and thus, the manufacturing costs thereof may be reduced and it is easy to maintain the strength of the gear plate 300 due to the integrated shape thereof. However, the support 324 and the external gear 322 of the gear plate 300 are not limited to the above manufacturing method, and the support 324 may be manufactured as a separate ring-shaped component and may then be fixedly assembled with the external gear 322 during an assembly process.

The support 324 may protrude such that the outermost point thereof is located farther outwards than the outermost point of the external gear 322. Thereby, the support 324 protrudes outwards and is inserted into the support groove 124, thus exhibiting the effect of substantially extending the gear plate 300 while maintaining the overall size of the seat recliner.

Further, the retainer 500 may be a ring-shaped plate having an external border and an internal border, the external border may be fixed to the upper end of the mobile flange 100 by welding W, the internal border may face the upper end of the external gear 322, and a central portion of the retainer 500 between the external border and the internal border may face the support 324 so as to cover the support 324. According to the present invention, the area of the central portion of the retainer 500, which covers the gear plate 300, may be increased, and thus, assembly strength may be more firmly secured. Further, according to another embodiment shown in FIG. 6, welding W may be performed at one side end of the retainer 500.

According to the seat recliner for vehicles, a sufficient support area between the retainer and the upper end of the gear plate may be secured, even though the radius of the base of the gear plate is increased in order to secure coupling strength of the gear plate, and thus, sufficient coupling strength and component supporting strength may be secured without increasing the overall size of the seat recliner.

As is apparent from the above description, a seat recliner for vehicles according to the present invention may secure a sufficient support area between a retainer and the upper end of a gear plate, even though the radius of a base of the gear plate is increased in order to secure coupling strength of the gear plate, and may thus secure sufficient coupling strength and component supporting strength without increasing the overall size of the seat recliner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A seat recliner for vehicles, comprising:
   a mobile flange having an open upper part thereof, a bottom surface, a side surface, an internal gear formed along an inner side of the side surface, and a support groove formed between an upper end of the internal gear and an upper end of the side surface to be located above the internal gear, both of the bottom surface and the side surface defining a seating space;

a gear plate inserted into the seating space of the mobile flange;

an external gear formed along an outer side of a side surface of the gear plate so that the external gear is engaged with the internal gear in a state in which the gear plate is eccentric from the mobile flange;

a support integrally connected to the external gear and extending outwards from an upper end of the external gear so as to be located in and contacted with the support groove; and a retainer for covering upper parts of the mobile flange and the gear plate, and fixed to an upper end of the mobile flange, wherein the support protrudes such that an outermost point thereof is located farther outwards than an outermost point of the external gear.

2. The seat recliner for vehicles according to claim 1, wherein a central part protrudes from a center of the bottom surface of the mobile flange, an eccentric cam is disposed between the central part and the gear plate, and the external gear and the internal gear are engaged with each other in a state in which the gear plate is eccentric from the mobile flange through pressing by the eccentric cam.

3. The seat recliner for vehicles according to claim 1, wherein the support groove and the support are formed in a ring shape, and the mobile flange and the gear plate are rotatable relative to each other in a state in which the support is placed in the support groove during reclining of a seat.

4. The seat recliner for vehicles according to claim 1, wherein the internal gear is formed on the inner side of the side surface of the mobile flange up to a designated height, and the support groove is formed in a remaining part of the inner side of the side surface above the internal gear.

5. The seat recliner for vehicles according to claim 1, wherein the support of the gear plate is located in the support groove in a spot where the external gear and the internal gear are engaged with each other.

6. The seat recliner for vehicles according to claim 1, wherein the support of the gear plate and the external gear have one material that integrally forms the support of the gear plate and the external gear.

7. The seat recliner for vehicles according to claim 1, wherein the retainer is a ring-shaped plate having an external border and an internal border, the external border is welded to the upper end of the mobile flange, the internal border faces the upper end of the external gear, and a central portion of the retainer between the external border and the internal border faces the support so as to cover the support.

8. The seat recliner for vehicles according to claim 1, wherein the retainer is a ring-shaped plate having an external border and an internal border, the retainer is disposed on the upper end of the mobile flange, one side end of the external border is welded to the mobile flange, the internal border faces the upper end of the external gear, and a central portion of the retainer between the external border and the internal border faces the support so as to cover the support.

9. The seat recliner for vehicles according to claim 1, wherein the gear plate has a base provided in a form of a vertical cylinder having a hollow formed in a center thereof, the external gear protrudes outwards from a side surface of the base, and the support extends outwards from the upper end of the external gear.

* * * * *